Patented Nov. 15, 1949

2,487,804

UNITED STATES PATENT OFFICE 2,487,804

SELECTIVE SORPTION PROCESS

Donald A. Hermanson, Plainfield, N. J., assignor to Socony-Vacuum Oil Company, Incorporated, a corporation of New York No Drawing. Application October 4, 1947, Serial No. 778,043

14 Claims. (Cl. 196—147)

This invention relates to a selective sorption process and, more particularly, is concerned with a method for separating hydrocarbon mixtures by contacting the same with a solid porous sorbent particle-form material, the pores of which are substantially filled with a gaseous material soluble in the sorbed component of said hydrocarbon mixture, thereby effecting a substantially rapid separation between the comparatively lower molecular volume and higher molecular volume components of said mixture by sorption of the former into the pores of the contact material, while the latter remain unsorbed.

The process of the present invention is a modification of the procedure described in co-pending application Serial Number 655,581, filed March 19, 1946, now abandoned. It was there disclosed that non-gaseous mixtures, at least one component of which is a liquid, may be separated by contacting the same with particles of a porous sorbent medium under conditions of contact such that the low viscosity, lighter components of the mixture were sorbed, leaving the high viscosity, heavier components unsorbed, thus effecting a separation of the mixture into two fractions.

In accordance with the present invention, it has now been discovered that the nature of the material present in the pores of the solid particle-form sorbent material employed, when contact is made with the mixture to be treated, has considerable effect on both the rate and selectivity of the sorption process. More specifically, it has been found that if the air normally present in the pores of the sorbent medium is replaced by a gaseous material soluble in the sorbed component of the mixture being treated, the rate of sorption can be substantially increased without interfering with the selectivity of the operation.

The process of this invention may be employed in separating non-gaseous complex mixtures containing at least one liquid component whenever two or more of the components comprising said mixture differ in molecular volume. The process of this invention may thus be used in separating the components of animal, vegetable, marine and mineral oils, waxes, resins, and similar mixtures. The selective sorption method described herein is particularly adaptable for the separation of hydrocarbon mixtures, such as those found in petroleum, into fractions having a low viscosity-high viscosity index and light color in comparison to the oil charge being treated and other fractions having a higher viscosity and a darker color than the original oil.

It has been found that porous contact materials, having a structure corresponding to that of an inorganic oxide gel having a substantially uniform porosity of low macropore volume with an average pore diameter not exceeding about 125 Angstrom units and a particle size preferably not smaller than about 30 mesh for most operations, have the ability to sorb the light components of a liquid hydrocarbon fraction while leaving substantially unsorbed, the darker, more viscous components. In this respect, the process of the present invention is to be distinguished from the decolorizing of petroleum oil by contacting the same with clay, bauxite, and similar materials, whereby the dark, heavier components of the oil are removed, leaving behind the lighter components. It will thus be seen that the action of these latter adsorbents is the reverse of that encountered in the selective sorption process described herein.

The macropore volume of the contact material employed in the present invention should be relatively low so that the pore volume is substantially that of micropores. In general, the volume of macropores, that is, those pores having radii larger than 100 Angstrom units, should constitute less than about 30 per cent of the total pore volume, and preferably 10 per cent or less. The measurement of pore size and pore size distribution in various porous materials is discussed in detail by L. C. Drake and H. L. Ritter in Industrial and Engineering Chemistry, Analytical Edition, volume 17, pages 782–791 (1945). The methods described there were essentially those employed in determining the bulk densities, average pore diameters, and other pore measurements of the absorbents employed in the present invention.

The size of the sorbent particles employed in the process of this invention is to some extent dependent upon the variables involved in any particular application of the process. These important variables are: time of contact between the liquid mixture under treatment and the sorbent in the sorption zone, temperature in the sorption zone, viscosity of the liquid charge, and, to a lesser extent, the ratio of liquid mixture to sorbent charged to the sorption zone. Increasing time of contact results in a decrease in the efficiency of the desired separation. Decreasing viscosity of the liquid charge has the same effect. On the other hand, increasing temperature and decreasing viscosity both result in more rapid sorption of the lighter, less viscous components of the mixture. If the ratio of sorbent to liquid charge is excessive, some loss in separation efficiency results. By proper control of these variables, some latitude in the average diameter of the sorbent employed may be provided. However, when the diameter of the particles becomes too small, the sorbent preferentially sorbs the heavier, more viscous components from the charge mixture in the same manner as well known decolorizing clays. This is shown in Table I below, in which is tabulated the results obtained upon separation of a mid-continent residuum using a silica-alumina gel type sorbent having a bulk density in the 4–8 mesh size range of about 0.7.

*Table I*

| Experiment Number | 1 | 4 | 5 | 6 | 7 | 2 | 3 |
|---|---|---|---|---|---|---|---|
| Charge Viscosity, S. U. V | 116.9 | 116.9 | 81.8 | 81.8 | 81.8 | 81.8 | 340 |
| Charge Ramsbottom Carbon | | | 2.3 | 2.3 | 2.3 | 2.3 | 5.1 |
| Mesh Size of Sorbent (Tyler) | 4–8 | 30–60 | 30–60 | 60–80 | 30–60 | 4–8 | 4–8 |
| Sorption Zone Contact Time | 24 hrs. | 24 hrs. | 2 min. | 2 min. | 2 hrs. | 72 hrs. | 4 hrs. |
| Sorption Zone Temperature, °F | 150 | 150 | 150 | 150 | 150 | 75 | 275 |
| Weight Ratio of Sorbent to Liquid Charge | 1 | 1 | 1 | 1 | 1 | 1 | 2.2 |
| Properties of Oily Constituent Retained by Sorbent: | | | | | | | |
| S. U. V. @ 210° F. sec | 69.7 | 129.2 | 75.2 | 81.7 | 115.4 | 49.7 | 151 |
| Ramsbottom Carbon, percent | | | 1.8 | 2.3 | 3.1 | | 2.4 |
| Properties of Materials Washed from Sorbent Surface: | | | | | | | |
| S. U. V. @ 210° F. sec | 164 | 100.1 | 85.9 | 80.5 | 76.0 | 139.2 | 650 |
| Ramsbottom Carbon, percent | | | 2.4 | 2.2 | 2.0 | 3.5 | 6.7 |

It will be apparent from the above Table I that when the gel type particles were greater than 30 mesh size, even at relatively high temperatures and long contact periods, the oily constituents of low viscosity and carbon residue were sorbed in the pores of the sorbent, while the more viscous, heavier constituents could be washed away with a suitable washing solvent, in this case benzol. On the other hand, in the case of sorbent particles ranging from 30 to 60 mesh size, when the contact period was 24 hours (experiment 4) or even 2 hours (experiment 7), the sorbent acted similar to a normal filtering clay and preferentially sorbed the heavier, more viscous constituents; but when the contact time was reduced to 2 minutes (experiment 5), the 30–60 mesh sorbent exhibited a preference for the lighter, less viscous constituents over the heavier, more viscous constituents. When the particle size was reduced below 60 mesh, the sorbent preferentially sorbed the heavier, viscous constituents, even at very low contact periods (experiment 6).

The effect of contact time and temperature is shown in Table II below, in which are tabulated the results obtained upon separation of an East Texas residuum having an original Saybolt Universal viscosity of 512 seconds at 210° F. and a Ramsbottom carbon residue of 11.1. In this experiment, a silica-alumina gel type sorbent of 4–8 mesh size and 0.48 bulk density were employed.

*Table II*

| Experiment Number | 1 | 2 | 3 |
|---|---|---|---|
| Sorption Zone Contact Time, Hrs | 4 | 4 | 2 |
| Sorption Zone Contact Temp., °F | 275 | 300 | 300 |
| Sorbent to Oil Weight Ratio | 1.6 | 1.4 | 1.5 |
| Ramsbottom Carbon Residue, percent of sorbed oily constituents | 1.9 | 2.6 | 2.0 |

In general, it may be said that the particle size of the sorbent material, particularly in the case of inorganic oxide gel type sorbents, should be less than about 60 mesh Tyler and preferably within the range of about 0.022 to 1.0 inch average diameter. The best results may be obtained by limiting the sorbents within the range of 0.03 to 0.20 inch average diameter and of reasonably uniform size. It is pointed out, however, that by proper control of the variables discussed hereinabove and also of the average pore diameter of the sorbent, operation according to the method of this invention may be obtained on sorbent particles outside the size ranges given, although the results will be less satisfactory. It is contemplated that, in its broader aspects, this invention covers these latter operations as well as the operations within the specified preferred limits.

The porosity of the gel particles employed in the process of this invention is of fundamental importance. The degree of porosity is generally reflected in the bulk density of the gel composite used; the lower the bulk density, the greater being the degree of porosity. For the purposes of the present process, porous sorbent particles having bulk densities of between about 0.4 and 1.1 grams per cubic centimeter are preferred. The bulk densities indicated correspond to an average pore diameter of between about 20 and about 125 Angstrom units. Preferably, the sorbent used will have a bulk density between about 0.6 and about 0.8 gram per cubic centimeter. Gel particles having a bulk density greater than about 0.8 have been found to have excellent selectivity but poor sorbing capacity, while particles with a bulk density less than about 0.6 have relatively poor selectivity. However, since the selectivity of the separation process improves with a decrease in temperature, particles with a bulk density of less than 0.6 would be satisfactory for treating stocks which can be processed at low temperatures.

The degree of porosity of a synthetic inorganic oxide gel will, in general, depend on the conditions under which it is prepared and allowed to set to gelation. A particularly convenient method of preparing gel particles used in the process of this invention is described in U. S. Patent 2,384,946, issued September 18, 1945, to Milton M. Marisic. It is there disclosed that spheroidal particles of inorganic oxide gel may be prepared by mixing an acidic stream with a stream of sodium silicate and allowing the resulting sol to be ejected from a nozzle into an oil column, where the gel sets in the form of bead-like spheroids. The resulting gel spheres, after washing, drying and tempering, were of a size varying between about 4 and about 20 mesh. The gel beads so produced had a bulk density of between about 0.4 and about 1.1 and an average pore diameter of between about 20 and about 125 Angstrom units. They proved to be excellent selective absorbents for use in the process of this invention.

Likewise, irregularly shaped porous absorbent fragments or particles having the structure of inorganic oxide gels may be used. However, in general, spheroidal particles are to be preferred, since attrition losses are then at a minimum and contamination with gel fines of the mixture undergoing treatment is substantially eliminated.

In general, siliceous gel particles will be used in the process of this invention, such as silica gel, silica-alumina gel, silica-zirconia gel, silica-thoria gel, and the like. Porous sorptive silica glasses having a structure approaching that of a siliceous gel likewise are contemplated for use in the process described herein, it being necessary, however, that the porous glasses employed have an average pore diameter less than about 125 Angstrom units, and a macropore volume of less than about 30 per cent of the total pore volume. The size of the porous glass particles must also be carefully controlled so as to obtain preferential sorption of the lighter, less viscous constituents of the mixture. Usually, particles of less than 60 mesh size are undesirable. It is also contemplated that, within the scope of this invention, other porous materials not of siliceous gel composition which have structures approaching that of an inorganic oxide gel and are within the above specified pore size and particle size may be employed in the selective sorption process of this invention.

Typical of the porous glasses used are those described in U. S. Patent 2,106,744, issued February 1, 1938, to Hood et al. There it is disclosed that a silica-alkali-boric oxide glass of suitable composition is prepared by a fusion process. Heat treatment of this glass results in separation of the glass into two phases; one phase is rich in alkali-boric oxide and is soluble in acids, while the other phase, which is insoluble in acid, consists of silica with a small amount of boric oxide. Extraction of this heat treated glass with acid results in a porous silica glass which can be employed as a porous absorbent separating medium in accordance with the present invention.

The displacement of air, normally present in the pores of the above defined contact material, with a suitable gaseous material may be effected in any desired manner. Thus, the air may be displaced from the pores of the inorganic gel type contact material by diffusion with a stream of gas or vapor. An alternate procedure involves subjecting the particles of porous contact material to a vacuum to remove substantially all the air present in the pores and then bringing the evacuated particles into contact with the gaseous material to be employed. Another way of replacing the air with suitable vapor is to soak the sorbent particles in a solvent until all the air has been displaced. This point will be reached when air bubbles are no longer evolved from the absorbent. The excess solvent is then removed and the remaining solvent-saturated particles heated to a temperature at which vaporization of the solvent begins to occur. The temperature is maintained at this level until substantially all of the solvent present in the pores of the contact material is vaporized. The particles filled with solvent vapor are then brought into contact with the mixture to be treated. An effective method for displacing air from the pores of the contact material comprises soaking the particles in a solvent until all the air has been replaced, removing the excess unsorbed solvent and subjecting the saturated particles to a high vacuum to vaporize the remaining solvent. The mixture to be separated is then added while the particles are still under vacuum, and then at completion of the addition of the mixture, the vacuum is broken and sorption takes place at atmospheric pressure.

The process of this invention is accordingly carried out by bringing a non-gaseous mixture containing components of differing molecular volume and at least one of which is a liquid in contact with a particle-form, porous medium having a structure of an inorganic oxide gel, the pores of which are substantially filled with a gaseous material soluble in the component of the mixture to be sorbed. The components of the mixture not sorbed may thereafter be separated from the porous particles containing sorbed material. Gaseous materials suitable for replacing air in the pores of the sorbent medium include both normally gaseous materials and vapors of materials which are normally found in the liquid or solid state. Generally, the pores of the sorbent used will be substantially filled with gaseous material. However, the process of this invention also contemplates the use of a sorbent medium having a partial displacement of the air contained in its pores with a suitable gaseous material. The proportion of air displaced by said gaseous material will generally be such as to effect a noticeable increase in the rate of sorption. The contacting is carried out in any suitable vessel where direct contact between particles of sorbent and the mixture to be separated is effected. The porous particles sorb the lower molecular volume components present in the mixture as liquids, while the higher molecular volume components remain unsorbed.

The temperature at which the contacting step is conducted may vary over wide limits, depending to a large extent on the nature of the mixture undergoing treatment. The minimum usable temperature is, in general, the lowest temperature at which the liquid component of lowest freezing point will flow. The maximum temperature at which the selective sorption process can be carried out is usually governed by the viscosity of the mixture being treated. The sorption becomes less selective as the viscosity of the mixture decreases. Thus, where the mixture being separated is a mineral oil fraction, the lowest temperature usable is that at which the oil will flow and the maximum temperature will be dependent on the viscosity of the fraction being separated. For a distillate stock, the maximum temperature may be below room temperature, while a heavy residual stock can be selectively separated at temperatures as high as about 350° F.

The time required for the selective sorption process to take place depends upon the degree of separation desired and also upon the conditions of the contact, such as the nature of the gaseous material occupying the pores of the absorbent, the viscosity of the mixture being treated, temperature, and the like. In general, saturation of the sorbent particles with the liquid mixture is not required and excessive contact time is to be avoided, since it has generally been found to reduce the selectivity of the operation.

When the process of this invention is employed in separating a mineral oil fraction, the weight ratio of sorbent to oil will generally be between about 0.5 and 3. With a weight ratio lower than that indicated, the sorbed fraction will generally be very small in proportion to the unsorbed fraction. The higher ratios will usually be employed with the sorbents of higher density whose sorbing capacity is smaller. An approximately equal weight mixture of oil and sorbent has been found to be particularly effective under the usual operation conditions.

The subsequent removal of unsorbed material from the porous sorbent particles may be accomplished by one of a number of methods, depending on the type of material contacted. If both the high and low molecular volume components of the mixture undergoing separation are liquids, the unsorbed material is allowed to drain or may be centrifuged. A certain amount of unsorbed material adheres to the surface of the contact particles and this is removed by washing with a suitable solvent. If the unsorbed material is a solid, separation may be accomplished by screening, solvent-washing, use of air currents to lift the lighter material, or other suitable methods.

The components sorbed by the particles of porous contact material may be recovered by solvent extraction or, if it is not desired to utilize this sorbed component, removal by burning may be used. The sorbent particles employed are regenerated by this solvent extraction or burning and may be re-used a large number of times before requiring replacement with fresh sorbent. The solvent employed for extracting the sorbed components may be the same or a different one from that initially used in filling the pores of the sorbent with vapor. If desired, more than one solvent can be employed for the extraction operation, each solvent selectively extracting various of the sorbed components.

The separation process described herein may be carried out either in batch operation or as a continuous process by adding a suitable quantity of the above described sorbent particles to the material being treated or percolating the mixture to be separated through a bed of porous sorbent, the pores of which are substantially filled with a gaseous material soluble in the sorbed component of the mixture undergoing treatment.

The following detailed examples will serve to illustrate the process of this invention without limiting the same:

*Example 1*

A silica-alumina hydrosol was prepared by mixing 1.00 volume of a solution of sodium silicate containing 157.0 grams of $SiO_2$ per liter with 1.00 volume of a solution containing 39.79 grams of aluminum sulfate and 30.51 grams of sulfuric acid per liter. The resulting colloidal solution was ejected from a nozzle in the form of globules into a column of gas oil whose depth was about eight feet. The globules of solution fell through the oil and gelled before passing into a layer of water located beneath the oil. The time of gelation for the concentrations and proportions of reactants given above was about 4 seconds. The spheroidal particles of gel were conducted out of the bottom of the column into a stream of water and, on removal from the water, base-exchanged with an aqueous solution of aluminum sulfate and water-washed. The globules were then slowly and uniformly dried in superheated steam at about 300° F. until shrinkage was substantially complete and the drying was continued at a gradually increasing temperature up to about 1050° F., which temperature was maintained for 0.5 hour. The silica-alumina gel resulting retained its spheroidal shape during the washing and drying operations and had a final particle size of about 4–20 mesh. The bulk density of particles so obtained was between about 0.4 and 1.1 grams per cubic centimeter and the average pore diameter was between about 20 and about 125 Angstrom units.

A quantity of the above prepared gel particles was soaked in benzene until all the air had been displaced from the gel pores. The excess benzene was then decanted off and the gel particles were subjected to a vacuum of less than 1 millimeter of mercury for 30 minutes to vaporize the remaining absorbed benzene. While the gel particles were still under vacuum, an equal weight of mineral oil was added thereto. The vacuum was then broken and the absorption process proceeded at atmospheric pressure. The oil employed had a Saybolt Universal viscosity of 108.1 seconds at 210° F., a color (Lovibond) of 155, and was refined by solvent-treating a Mid-Continent residue. Contact between said oil and the gel particles was maintained for 6 hours at 75° F. The oil not taken up by the particles was filtered off (unabsorbed oil). The oil adhering to the outer surface was washed off with a solvent and recovered (wash). The oil absorbed in the gel pores was extracted with a solvent mixture of equal volumes of benzene and methyl-ethyl ketone, and recovered.

The above procedure was repeated for purposes of comparison, using gel particles in which the air had not been displaced with benzene vapor. The following properties were observed in the absorbed oil resulting from each operation:

*Table III*

| Material in Gel Pores Before Contacting | Yield of Absorbed Oil (percent Wt.) | Viscosity of Absorbed Oil (S. U. V. at 210° F.) | Color of Absorbed Oil (Lovibond) |
|---|---|---|---|
| Benzene vapor | 27.6 | 77.4 | 14 |
| Air | 12.9 | 71.2 | 17 |

The above results clearly indicate that the rate of absorption of the gel particles has been more than doubled without the selectivity of the operation being appreciably affected when air normally present in the gel pores was displaced by benzene vapor.

While the process of the present invention is not to be limited by any theory, it would appear that the ability of benzene vapor and like materials to condense and dissolve in the oil being absorbed considerably increases the rate of absorption since the resistance to absorption offered by a non-condensable, slightly soluble gas such as air is thereby eliminated.

A series of experiments carried out in a manner similar to that described above in Example 1 further showed that the nature of the material present in the gel pores has considerable effect on the rate and selectivity of the operation. The results of these experiments are tabulated below:

pore size distribution of pores, and particle size are of fundamental importance to the selective

*Table IV*

| Example | Material in Gel Pores Before Contacting | Contacting Conditions | | | Yields (Per Cent Wt.) | | | S. U. V. @ 210° F., Seconds | | | |
|---|---|---|---|---|---|---|---|---|---|---|---|
| | | Absorbent/Oil Ratio (by Wt.) | Time, Hrs. | Temp., °F. | Absorbed Oil | Wash | Unabsorbed Oil | Charge | Absorbed Oil | Wash | Unabsorbed Oil |
| 1 | Cold Benzol Vapor | 1 | 6 | 75 | 27.6 | 13.7 | 56.4 | 108.1 | 77.4 | 125.5 | 128.6 |
| 2 | Air | 1 | 6 | 75 | 12.9 | 28.7 | 57.6 | 108.1 | 71.2 | 112.4 | 116.7 |
| 3 | Hot Benzol Vapor | 1 | 6 | 75 | 26.9 | 20.1 | 52.8 | 108.1 | 74.7 | 128.6 | 126.8 |
| 4 | Cold Naphtha Vapor | 1 | 6 | 75 | 28.4 | 13.6 | 57.1 | 108.1 | 67.5 | 130.8 | 131.2 |
| 5 | Hot Naphtha Vapor | 1 | 6 | 75 | 16.9 | 28.4 | 53.6 | 108.1 | 67.9 | 105.0 | 113.7 |
| 6 | Vacuum (0.1 mm. Hg) | 1 | 6 | 75 | 12.4 | 27.4 | 58.0 | 108.1 | 67.8 | 111.9 | 120.6 |
| 7 | Air | 1 | 20 | 150 | 38.6 | 17.6 | 41.0 | 108.1 | 81.4 | 144.5 | 139.0 |
| 8 | Carbon Dioxide | 1 | 20 | 150 | 40.4 | 20.1 | 38.5 | 108.1 | 79.2 | 133.0 | 137.7 |
| 9 | Nitrogen | 1 | 20 | 150 | 39.2 | 18.8 | 39.5 | 108.1 | 78.2 | 145.9 | 145.3 |
| 10 | M. E. K. (Liquid) | 1 | 20 | 150 | 18.6 | 19.7 | 61.0 | 108.1 | 95.1 | 111.8 | 109.6 |
| 11 | Benzol (Liquid) | 1 | 20 | 150 | 26.3 | 8.8 | 63.0 | 108.1 | 103.7 | 119.5 | 111.1 |

| Example | Material in Gel Pores Before Before Contacting | Viscosity Index | | | | Color (Lovibond, ¼" Cell) | | | | Estimated Selectivity of Process |
|---|---|---|---|---|---|---|---|---|---|---|
| | | Charge | Absorbed Oil | Wash | Unabsorbed Oil | Charge | Absorbed Oil | Wash | Unabsorbed Oil | |
| 1 | Cold Benzol Vapor | 103 | 105 | 102 | 104 | 155 | 14 | 250 | 250 | Good. |
| 2 | Air | 103 | 109 | 102 | 102 | 155 | 17 | 225 | 200 | Do. |
| 3 | Hot Benzol Vapor | 103 | 106 | 102 | 103 | 155 | 15 | 325 | 300 | Do. |
| 4 | Cold Naphtha Vapor | 103 | 109 | 102 | 103 | 155 | 6 | 300 | 300 | Do. |
| 5 | Hot Naphtha Vapor | 103 | 109 | 105 | 103 | 155 | 7 | 250 | 200 | Do. |
| 6 | Vacuum (0.1 mm. Hg) | 103 | 110 | 104 | 102 | 155 | 9 | 200 | 200 | Do. |
| 7 | Air | 103 | 103 | 101 | 103 | 155 | 60 | 250 | 245 | Do. |
| 8 | Carbon Dioxide | 103 | 105 | 103 | 103 | 155 | 72 | 250 | 248 | Do. |
| 9 | Nitrogen | 103 | 104 | 102 | 102 | 155 | 65 | 275 | 250 | Do. |
| 10 | M. E. K. (Liquid) | 103 | 98 | 104 | 104 | 155 | 165 | 160 | 150 | Slight. |
| 11 | Benzol (Liquid) | 103 | 96 | 104 | 105 | 155 | 190 | 209 | 190 | None. |

From the above table, it will be evident that the presence in the gel pores of gaseous materials which have the ability to dissolve in the sorbed component of the oil appreciably increase the rate of sorption. The present invention accordingly contemplates the use in a selective sorption medium of the type described of any gaseous material soluble in the sorbed component. Representative of the gaseous materials which may suitably be employed for displacing air from the pores of the contact material when mineral oil fractions are treated include solvent vapors such as those of benzene, naphtha, toluene, xylene, acetone, methyl-ethyl ketone, and other materials which dissolve in the sorbed oily component. The normally gaseous hydrocarbons, such as methane, ethane, and mixtures thereof, may also be used as a displacing gaseous material when mineral oil fractions are treated in accordance with the procedure of this invention. However, preferably, the aforementioned solvent vapors will be employed and particular preference is accorded those vapors which dissolve in the sorbed component at an appreciable rate, since the rate of sorption is thereby increased. Displacement of the air contained in the pores with a non-condensable gas, on the other hand, such as carbon dioxide or nitrogen, had no significant effect on either the rate or selectivity or the sorption process. Evacuating the gel sorbent particles before addition of the oil did not appear to have any significant effect on the operation. Saturation of the gel particles with liquids such as benzene, or methyl-ethyl ketone, on the other hand, greatly reduced the amount of oil that could be sorbed and almost completely destroyed the selectivity of the sorption process.

It is to be understood that in addition to the nature of the material present in the pores of the particle-form sorbent medium employed, the sorption process under the particular condition of time and temperature of contact employed. Porous contact materials having a structure corresponding to that of an inorganic oxide gel having a substantially uniform porosity of low macropore volume with an average pore diameter not exceeding about 125 Angstrom units function as excellent sorbents in the present process. It should be noted that clay and various pelleted or extruded, synthetic siliceous composites, such as those employed in the cracking of petroleum hydrocarbons, are not effective sorbents for use in the present selective separation process. These materials contain, in addition to the small pores present in the gel structure, relatively large voids having pore diameters of 1000–10,000 Angstrom units and larger, which render the material ineffective for use as a sorbent in the present invention.

This application is a continuation-in-part of co-pending application Serial Number 709,788, filed November 14, 1946, now abandoned.

I claim:

1. A process for separating a liquid mixture of hydrocarbons having components of differing molecular volume, which comprises contacting said mixture with a porous particle-form sorbent material in which the pores are mostly micropores and the volume of pores having radii greater than about 100 Angstrom units is less than about 30 per cent of the total pore volume, the air normally contained in the pores of said sorbent material being at least partially replaced by a gaseous material which is appreciably soluble in the lower molecular volume components of said mixture, chemically inert under the conditions of contact and present in such proportion as to effect a noticeable increase in the rate of sorption as compared with a sorbent material having its pores wholly occupied by air, controlling the contact time, the temperature, and the relative amounts of mixture and sorbent to effect sorption of the lower molecular volume components into the pores of said sorbent, while leaving substantially unsorbed the larger molecular volume components, thereby effecting a separation of the mixture into two fractions.

2. A process of separating a liquid mixture of hydrocarbons having components of differing molecular volume, which comprises sorbing the lower molecular volume components of said mixture into the pores of a substantially microporous particle-form sorbent contact material, the particles of which are greater than about 60 mesh size and in which less than 30 per cent of the total pore volume is occupied by pores having radii greater than about 100 Angstrom units, the air normally contained in the pores of said sorbent material being at least partially replaced by a gaseous material which is appreciably soluble in the lower molecular volume components of said mixture, chemically inert under the conditions of contact and present in such proportion as to effect a noticeable increase in the rate of sorption as compared with a sorbent material having its pores wholly occupied by air, while leaving substantially unsorbed the higher molecular volume components, thereby effecting a separation of said mixture into two fractions.

3. A process for separating a liquid mixture of hydrocarbons having components of differing molecular volume, which comprises contacting said mixture with a porous particle-form inorganic oxide gel contact material in which most of the pores are micropores and the volume of pores having radii greater than about 100 Angstrom units is less than about 30 per cent of the total pore volume and in which the particles are greater than about 30 mesh size, the air normally contained in the pores of said contact material being at least partially replaced prior to said contacting with a gaseous material which is appreciably soluble in the lower molecular volume components of said mixture, chemically inert under the conditions of contact and present in such proportion as to effect a noticeable increase in the rate of sorption as compared with a contact material having its pores wholly occupied by air, whereby sorption of the lower molecular volume components of said mixture into the pores of said contact material takes place, while the higher molecular volume components of said mixture remain substantially unsorbed, thereby effecting a separation of the mixture into two fractions.

4. A process for separating a liquid mixture of hydrocarbons having components of differing molecular volume, which comprises contacting said mixture with uniform, substantially microporous, siliceous gel particles having a particle size not less than about 60 mesh and in which the volume of pores having radii greater than about 100 Angstrom units is less than about 30 per cent of the total pore volume, the air normally contained in the pores of said gel particles being at least partially replaced prior to said contacting with a gaseous material which is appreciably soluble in the lower molecular volume components of said mixture, chemically inert under the conditions of contact and present in such proportion as to effect a noticeable increase in the rate of sorption as compared with gel particles the pores of which are wholly occupied by air, whereby sorption of the lower molecular volume components of said mixture takes place, while the higher molecular volume components of said mixture remain substantially unsorbed, thereby effecting a separation of the mixture into two fractions.

5. A process for treating a liquid mixture of hydrocarbons having components of differing molecular volume by selective sorption of the lower molecular volume, less viscous components from the higher molecular volume, more viscous components, which comprises contacting said mixture with uniform, substantially microporous inorganic oxide gel particles having a particle size not less than about 60 mesh and a total pore volume made up mostly of micropores, there being less than about 30 per cent of pores having radii greater than about 100 Angstrom units, the air normally contained in the pores of said gel particles being at least partially replaced prior to said contacting with a gaseous material which is appreciably soluble in the lower molecular volume components of said mixture, chemically inert under the conditions of contact and present in such proportion as to effect a noticeable increase in the rate of sorption as compared with gel particles the pores of which are wholly occupied by air, whereby the low viscosity, low molecular volume components of said mixture are sorbed into the pores of said gel particles, while the high viscosity, high molecular weight components remain unsorbed, thereafter separating said gel particles from said unsorbed components and removing the sorbed components from the pores of said gel particles, to thereby effect a separation of the components of said mixture into two fractions, one having a lower viscosity than the original mixture and the other a greater viscosity than the original mixture.

6. A process for treating a liquid mixture of hydrocarbons having components of differing molecular volume by selective sorption of the lower molecular volume, less viscous components from the higher molecular volume, more viscous components, which comprises contacting said mixture with uniform, substantially microporous, siliceous gel particles having a particle size not less than about 30 mesh and a total pore volume made up mostly of micropores, there being less than about 30 per cent of pores having radii greater than about 100 Angstrom units, the air normally contained in the pores of said gel particles being at least partially replaced prior to said contacting with a gaseous material which is appreciably soluble in the lower molecular volume components of said mixture, chemically inert under the conditions of contact and present in such proportion as to effect a noticeable increase in the rate of sorption as compared with gel particles the pores of which are wholly occupied by air, whereby the low viscosity, low molecular volume components of said mixture are sorbed into the pores of said gel particles, while the high viscosity, high molecular volume components remain unsorbed, thereafter separating said gel particles from said unsorbed components and removing the sorbed components from the pores of said gel particles to effect a separation of the components of said mixture into two fractions, one having a lower viscosity than the original mixture and the other a greater viscosity than the original mixture.

7. A process for treating a mineral oil fraction, which comprises contacting said oil with a particle-form contact material of substantial particle size as distinguished from powdered contact material, said contact material being of a porous structure, wherein less than 30 per cent of the total pore volume is occupied by pores of greater than about 100 Angstrom units radius, the air normally contained in the pores of said contact material being at least partially replaced prior to said contacting with a gaseous material which is appreciably soluble in the lower molecular volume components of said oil, chemically inert under the conditions of contact, and present in such proportion as to effect a noticeable increase in the rate of sorption as compared with a contact material having its pores wholly occupied by air, controlling the contact time, the temperature, and the relative amounts of oil and contact material to effect sorption of the lower molecular volume components of said oil into the pores of said contact material, while leaving unsorbed the larger molecular volume components, thereby effecting a separation of the oil into two fractions, one fraction comprising tthe lower molecular volume components and having a viscosity substantially less than that of the original oil and the other fraction comprising the larger molecular volume components and having a viscosity substantially greater than that of the original oil.

8. A process for treating a mineral oil fraction, which comprises contacting said oil with a porous inorganic oxide gel contact material consisting of particles having an average diameter greater than about 0.022 inch and having less than 30 per cent of its pore volume taken up by pores of radii greater than about 100 Angstrom units, the remaining pore volume being taken up by smaller pores, the air normally contained in the pores of said contact material being at least partially replaced prior to said contacting with a gaseous material which is appreciably soluble in the lower molecular volume components of said oil, chemically inert under the conditions of contact, and present in such proportion as to effect a noticeable increase in the rate of sorption as compared with a contact material having its pores wholly occupied by air, controlling the contact time, the temperature and the relative amounts of oil and contact material to effect sorption of the lower molecular volume components of said oil into the pores of said contact material, while leaving unsorbed the larger molecular volume components, thereby effecting a separation of the oil into two fractions, one fraction comprising the lower molecular volume components and having a viscosity substantially less than that of the original oil and the other fraction comprising the larger molecular volume components and having a viscosity substantially greater than that of the original oil.

9. A process for separating a mineral oil fraction into components of differing molecular volume by selective sorption of the low viscosity, light-colored components from the higher viscosity, dark-colored components, comprising contacting said oil with uniform, substantially microporous inorganic oxide gel particles having less than about 30 per cent of their pore volume taken up by pores of radii greater than about 100 Angstrom units, the remaining pore volume being taken up by smaller pores and having a particle size not less than about 30 mesh, the air normally contained in the pores of said gel particles being at least partially replaced prior to said contacting with a vapor which is appreciably soluble in the low viscosity, light-colored components of said oil, chemically inert under the conditions of contact and present in such proportion as to effect a noticeable increase in the rate of sorption as compared with gel particles the pores of which are wholly occuped by air, whereby sorption of the low viscosity, light-colored components of said oil into the pores of said particles takes place, while the high viscosity, dark-colored components remain unsorbed, thereafter separating said gel particles from said unsorbed components and removing the sorbed components from pores of said particles to effect a separation of said oil in two fractions, one having a lower viscosity and a lighter color than the original oil and the other having a greater viscosity and a darker color than the original oil.

10. A process for separating a mineral oil fraction into components of differing molecular volume by selective sorption of the low viscosity, light-colored components from the higher viscosity, dark-colored components, comprising contacting said oil with uniform, substantially microporous siliceous gel particles having less than about 30 per cent of their pore volume taken up by pores of a radii greater than about 100 Angstrom units, the remaining pore volume being taken up by smaller pores and having a particle size not less than about 60 mesh, the air normally contained in the pores of said gel particles being at least partially replaced prior to said contacting with a vapor which is appreciably soluble in the low viscosity, light-colored components of said oil, chemically inert under the conditions of contact and present in such proportion as to effect a noticeable increase in the rate of sorption as compared with gel particles the pores of which are wholly occupied by air, whereby sorption of the low viscosity, light-colored components of said oil into the pores of said particles takes place, while the high viscosity, dark-colored components remain unsorbed, thereafter separating said gel particles from said unsorbed components and removing the sorbed components from the pores of said particles to effect a separation of the oil into two fractions, one having a lower viscosity and a lighter color than the original oil and the other a greater viscosity and a darker color than the original oil.

11. A process for treating a petroleum lubricating oil fraction, which comprises contacting said fraction with a porous particle-form sorbent material in which the pores are mostly micropores and the volume of pores having radii greater than about 100 Angstrom units is less than about 30 per cent of the total pore volume, the air normally contained in the pores of said sorbent material being at least partially replaced prior to said contacting with a gaseous material which is appreciably soluble in the low viscosity components of said oil, chemically inert under the conditions of contact and present in such proportion as to effect a noticeable increase in the rate of sorption as compared with a sorbent material having its pores wholly occupied by air, controlling the contact time, the temperature, and the relative amounts of oil and sorbent to effect sorption of the low viscosity, light-colored components of said oil into the pores of said sorbent, while the high viscosity, dark-colored components of said oil remain unsorbed, thereby effecting a separation of the components of said oil into two fractions, one having a lower viscosity and a lighter color than the original oil and the other a greater viscosity and a darker color than the original oil.

12. A process for separating a petroleum lubricating oil fraction by selective sorption of the low viscosity, light-colored components from the higher viscosity, dark-colored components, comprising contacting said oil with uniform, substantially microporous inorganic oxide gel particles having less than about 30 per cent of their pore volume taken up by pores having radii greater than about 100 Angstrom units, the remaining pore volume being taken up by smaller pores and having a particle size not less than about 60 mesh, the air normally contained in the pores of said gel particles being at least partially replaced prior to said contacting with a vapor which is appreciably soluble in the low viscosity, light-colored components of said oil, chemically inert under the conditions of contact and present in such proportion as to effect a noticeable increase in the rate of sorption as compared with gel particles the pores of which are wholly occupied by air, whereby sorption of the low viscosity, light-colored components of said oil into the pores of said gel particles takes place, while the high viscosity, dark-colored components remain unsorbed, thereafter separating said gel particles from said unsorbed components and removing the sorbed components from the pores of said gel particles to effect a separation of the components of said oil into two fractions, one having a lower viscosity and a lighter color than the original oil and the other a greater viscosity and a darker color than the original oil.

13. A process for separating a petroleum lubricating oil fraction by selective sorption of the low viscosity, light-colored components from the higher viscosity, dark-colored components, comprising contacting said oil with uniform, substantially microporous inorganic oxide gel particles having a particle size not less than about 30 mesh and in which most of the pores are micropores, the volume of pores having radii greater than about 100 Angstrom units being less than about 30 per cent of the total pore volume, the air normally contained in the pores of said gel particles being at least partially replaced prior to said contacting with a vapor which is appreciably soluble in the low viscosity, light-colored components of said oil, chemically inert under the conditions of contact and present in such proportion as to effect a noticeable increase in the rate of sorption as compared with gel particles the pores of which are wholly occupied by air, whereby sorption of the low viscosity, light-colored components of said oil into the pores of said gel particles takes place, while the high viscosity, dark-colored components remain unsorbed, thereafter separating said gel particles from said unsorbed components, washing said particles with a suitable oil solvent to remove oil adhering to the surface thereof, solvent-extracting the sorbed components from the pores of said gel particles, and recovering said sorbed components from the resulting extract to yield a fraction having a lower viscosity and a lighter color than the original oil.

14. A process for separating a petroleum lubricating oil fraction by selective sorption of the low viscosity, light-colored components from the higher viscosity, dark-colored components, comprising contacting said oil with uniform, substantially microporous siliceous gel particles in which the percentage of pore volume due to pores having radii greater than about 100 Angstrom units is less than about 30, said particles having a size not less than about 30 mesh and the air normally contained in the pores of said gel particles being at least partially replaced prior to said contacting with a vapor which is appreciably soluble in the low viscosity, light-colored components of said oil, chemically inert under the conditions of contact and present in such proportion as to effect a noticeable increase in the rate of sorption as compared with gel particles the pores of which are wholly occupied by air, whereby the low viscosity, light-colored components of said oil are sorbed into the pores of said gel particles, while the high viscosity, dark-colored components remain unsorbed, thereafter separating said gel particles from said unsorbed components, washing said particles to remove oil adhering to the surface thereof with a suitable oil solvent, solvent-extracting the sorbed components from the pores of said gel particles, and recovering said sorbed components from the resulting extract to yield a fraction having a lower viscosity and a lighter color than the original oil.

DONALD A. HERMANSON.

REFERENCES CITED

The following references are of record in the file of this patent:

UNITED STATES PATENTS

| Number | Name | Date |
|---|---|---|
| 1,665,264 | Holmes | Apr. 10, 1928 |
| 2,331,353 | Stoewener et al | Oct. 12, 1943 |
| 2,337,944 | Stoewener et al | Dec. 28, 1943 |
| 2,384,311 | Kearby | Sept. 4, 1945 |
| 2,384,946 | Marisic | Sept. 18, 1945 |
| 2,398,101 | Lipkin | Apr. 9, 1946 |
| 2,441,572 | Hirschler et al | May 18, 1948 |